Oct. 14, 1930.                E. H. LANGE                1,778,220
AUTOMOBILE CLUTCH CONTROL SYSTEM
Filed June 23, 1930
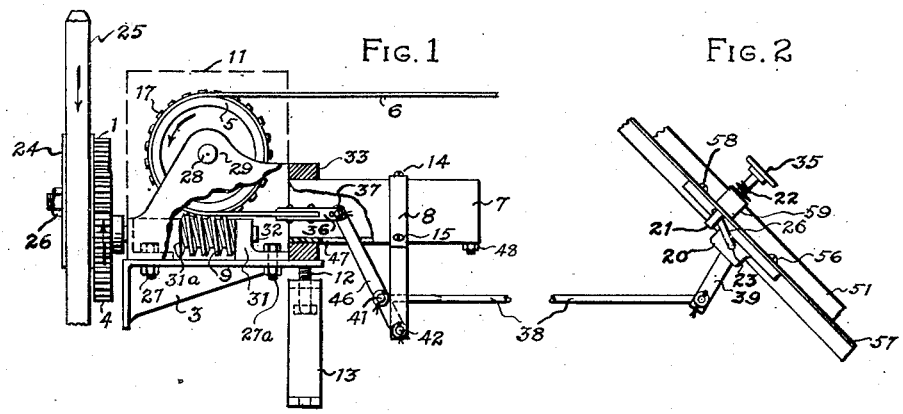
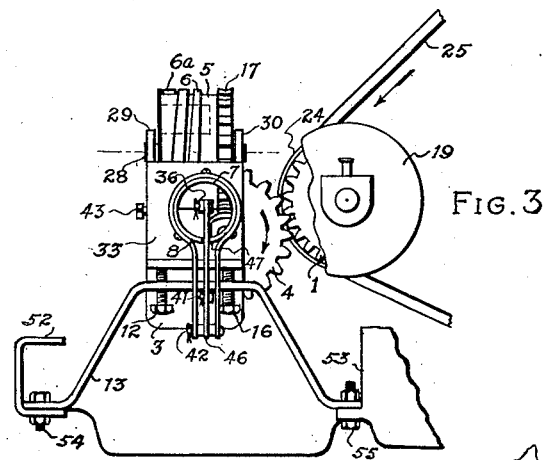
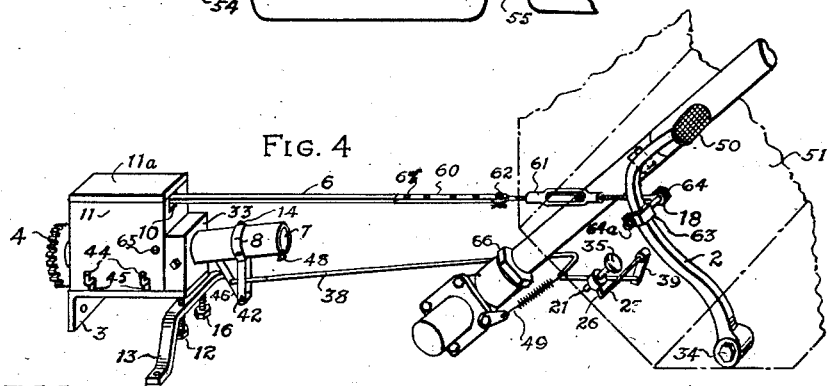
WITNESS.
H. A. Letmate
INVENTOR.
Edward H. Lange.

Patented Oct. 14, 1930

1,778,220

UNITED STATES PATENT OFFICE

EDWARD H. LANGE, OF BALTIMORE, MARYLAND

AUTOMOBILE CLUTCH-CONTROL SYSTEM

Application filed June 23, 1930. Serial No. 463,133.

This invention relates to a device by means of which the clutch pedal at present used in the majority of automobiles need be used only occasionally as an emergency pedal, the normal operation of the clutch pedal being accomplished indirectly by means of a small force and motion impressed upon a floor button located in a position of maximum comfort for the operator. The object of this invention is to provide a device which is simple in structure, inexpensive to manufacture, reliable in its operation, and readily adaptable to present types of automobile without considerable and costly change in automobile design, by means of which the principal power for clutch operation is supplied by the engine, and the clutch pedal smoothly controlled by the small motion of a floor button operated by the foot. A further object of this invention is to provide a clutch control system which eliminates the tiresome posture necessary in the operation of the clutch pedal at present commonly used, and at the same time retains essentially the same operating technique, with the continuous control of the clutch pedal in all its intermediate positions maintained at the floor button, but requiring considerably less effort.

This invention, substantially as shown in Figures 1, 2, 3 and 4 of the accompanying drawings, has been reduced to practice by the undersigned inventor, and the objects stated have been shown to be accomplished by actual test under operating conditions over a considerable period of time.

The method of securing amplification of the applied force is essentially the same as that described and claimed in my pending application, filed October 9, 1929, Serial Number 398,549, the title of which is Automobile clutch control system, and which shows in Fig. 3 of the drawings the amplifier unit. The features which are new are the combination of a motion increasing linkage with the low tension end of the amplifier, the design of the amplifier unit and frictional belt to take power at a location adjacent the electric generator or ventilating fan belt, the clutch pedal attachment, and the adjustable support for the amplifier unit. These features can be better understood by reference to the accompanying drawings, in which Fig. 1 shows a side view of the amplifier unit driven from the pulley of the electric generator, and adjustably mounted upon a support held by the chassis and engine base, Fig. 2 shows the floor button mounting and mechanism, Fig. 3 shows an end view of the amplifier unit, adjustable support and part of the low tension motion increasing linkage, and Figure 4 shows the complete assembly of the device and appearance when attached to an automobile.

Referring to the drawing, Fig. 1, the electric generator pulley 24 is driven by the belt 25, and the belt 25 also may drive a ventilating fan in a manner well understood and commonly used. At 26 is shown the end of the generator shaft and nut which secures the pulley 24 to the generator shaft. Fixed to the generator pulley is the gear wheel 1, and meshed to 1 is the gear wheel 4 of the tension amplifier. The belt 25 is driven by the engine. The tension amplifier unit consists of the frame 33 which contains the bearings 31 and 31ª, the shaft 32, the worm 9, the tube 7, the drum 5 and attached gear wheel 17, the drum shaft 28 and drum shaft bearings, one of which is shown at 29. The gear wheel 4 is fixed to the shaft 32 and rotates the worm wheel 9 which is also fixed to 32. The drum 5 and attached gear wheel 17 are rotated at reduced speed by the worm 9, and the drum is fixed to the shaft 28 which is free to rotate at the bearing 29. Within the enclosure of the frame 33, and at the base, are the bolts 27 and 27ª which secure the frame to the base plate 3. The base plate 3 is arranged to be bolted at the end adjacent the gear wheel 4 to a transverse support from the engine or chassis, or both. At the opposite end of 3 is the adjustable support 13, the lower end of which spans the engine base and chassis, and the upper part of 13 contains the set screws 12 and 16, only 12 being shown. By means of these screws the base plate 3 can be adjusted so as to be free from any deflection of consequence when the amplifier is under stress, and the alignment of the gears 1 and 4 thus maintained. The tube 7 serves as a housing for the low tension end of the belt 6, and also supports the pin 42 and lever 46, which is a part of the motion increasing linkage. The member 8 consists of a band formed around the tube 7 and extended so as to give a double bearing for the pin 42, and is fastened to 7 by screws as shown at 14 and 15. The bottom of the tube 7 is slotted for a sufficient part of its length to permit the flat lever 46 to slide back and forth. The slot 47 extends to the outer end of the tube 7, and the lever 46 is limited in its travel by the bolt 48. By removal of 48, the lever 46 is readily made accessible for the purpose of attaching the low tension end of the belt 6, shown at 36. The flexible frictional belt 6 has one or more convolutions about the drum 5, and the forked member 36 is riveted to the end of the belt 6 and pinned to the lever 46 by means of the pin 37. The rod 38 is pinned to the lever 46 by the pin 41, and so arranged that a small motion of 38 gives rise to a larger motion of the pin 37 which applies force to the low tension end of the belt 6. The tube 7 is secured in the solid portion of the frame 33 by means of a set screw, a section of the solid portion of the frame being shown for a vertical plane passing through the axis of the tube 7. The drum and portion of the belt 6 coupled with the drum are protected from exposure to weather and extraneous lubricants by the enclosure 11, which is later described.

Referring to Fig. 2, an extension of the rod 38 is shown pinned to the lever 39, which is fixed at one end of the shaft 23, the other end of the shaft 23 being fixed to the lever 26. The shaft 23 is free to rotate in the bearing block 20, which also supports the sleeve 59. The bearing block 20 is secured to the floor board support 57 by means of the screws 56 and 58. Within the sleeve 59 slides the rod 21, one end of which contains a slot through which the end of the lever 26 projects. The other end of the rod 21 terminates in the floor button 35. The spring 22 about the rod 21 insures proper return of the button 35, and prevents the lever 26 from binding within the rod 21 when in the position of maximum deflection, but is not relied upon to return the linkage to its normal or undeflected position. For this purpose a spring is attached to the rod 38, as later described. The inclined portion of the floor of the car is shown at 51.

Referring to Fig. 3, the generator belt 25, pulley 24 and generator 19 are shown, also the gear wheel 1. The bearings 29 and 30 for the drum shaft 28 are shown, the bearings being a part of the frame 33. The set screw 43 secures the tube 7 within the solid part of the frame 33 as shown. As the available space for the amplifier unit between the generator shown and the hood of the engine which is not shown, is usually not large, it is necessary to have the amplifier unit as narrow as possible. The width is determined largely by the width of the drum, and this in turn is determined by the necessary tension amplification, that is the number of convolutions of the belt 6 about the drum 5, and the minimum permissible width of the belt from the standpoint of strength. In accordance with well known mechanical principles, the tension in the belt 6 due to friction on the drum increases rapidly from the low tension end at 36 to the high tension end at 6ª, so that if the belt section at 6ª is made sufficiently large for the maximum tension, the remainder of the belt having less tension can be tapered so as to have approximately the same stress as the portion at 6ª. Tapering the frictional belt 6 thus results in a useful reduction in the necessary drum width. The chassis channel beam is shown at 52, and the adjustable support 13 is bolted to the beam by the bolt 54, and to the engine base by the bolt 55. The adjusting screws 12 and 16 are threaded through the support 13, and exert pressure upon the base 3. The bolt 48 which limits the travel of the lever 46, is not shown in Fig. 3 in order that the slot 47 may be evident.

Figure 4 shows the sheet metal enclosure 11 for the amplifier unit, and the removable cover 11ª. The enclosure has an opening at 10 to permit the belt 6 to pass through, and is fastened to the frame 33 by the screw 65. At 44 are shown oil tubes which pass through the frame 33 to the wormshaft bearings. The enclosure 11 is slotted at 45, to accommodate the oil tubes. In Fig. 4 the tube 7 is shown slightly deviated from the vertical plane instead of perpendicular to the end of the frame 33 as in Fig. 1 and Fig. 3. While this is not essential to the operation of the device, it has been found that the pitch of the belt as it emerges from the drum is better accommodated by the lever 46, and that an additional advantage results by causing the rod 38 to escape the end of the steering rod at 66, thus requiring fewer bends in the rod 38, and giving greater stiffness to the rod. The high tension end of the belt 6 is fastened to the metal strip 60 by means of the rivets 67, and the metal strip is pinned at 62 to one screw of the turnbuckle 61, the other screw of which terminates at 18, and is bolted at 64 and 64ª to the collar 63, which fits over the clutch pedal lever 2. By means of the turnbuckle the tension in the belt 6 may be adjusted. The floor button 35, lever 26, and lever 39 are shown in their normal position, the bearing block in which the shaft 23 turns being omitted for clarity. The floor board planes are shown at 51, the clutch pedal foot rest at 50, the clutch pedal axis at 34, and linkage return spring at 49.

The arrangement of the device as shown in Fig. 4 can be readily changed as regards the exact location of the floor button 35. In many automobiles manufactured at the present time the space available at the inclined part of the floor for the operator's left foot is small because of the clutch pedal location, and in many instances it is practically impossible for the operator to find a comfortable position for the left foot on the inclined part of the floor because of interference with the clutch pedal. With the present invention the clutch pedal is necessary only in certain cases hereafter discussed, and thus the clutch pedal foot rest 50 can be considerably reduced in size, and a space thereby provided, permitting the left foot to rest in a comfortable outstretched position. The small force and motion necessary for clutch operation with this device require only a minimum deviation from this comfortable position of the operator's left foot.

The action of the device in operating the clutch can be understood by reference to Fig. 1 and Fig. 2. If the engine is at rest, it is started in the usual manner, and if it is desired to release the clutch upon starting, the clutch pedal must be used for this purpose as the floor button is useful for clutch operation only when the drum 5 is rotating. In order to disengage the clutch for the purpose of shifting the usual manually operated transmission gear shift lever to one of the running positions, force is exerted upon the button 35, and it is depressed. The magnitude of the force and motion necessary is small compared with the force and motion necessary for clutch pedal operation, and it is not necessary to lift the foot from the floor; the foot is simply turned about the heel as a pivot and elevated sufficiently to accommodate the floor button. The lever 26 is thereby depressed, and the lever 39 rotated to the right. The rod 38 and low tension end of the frictional belt 6 are thus moved to the right, the travel of the button 35 being a fifth or less of the travel of the low tension end of the frictional belt, as may be conveniently arranged by the proportional lengths of the levers 26, 39 and 46. The drum 5 rotates in a direction so as to wind up the high tension end of 6 which is connected to the clutch pedal. When the pedal is deflected its maximum amount, the belt 6 slips upon the drum 5. The tension at the high tension end of the belt is proportional to the tension applied at the low tension end, and this is under the continuous control of the operator at the button 35. The maximum tension is limited by the stop at the bolt 48. Release of the button 35, causes the belt 6 to slip around the drum and return the clutch pedal to its normal position. The spring 49 shown in Fig. 4, facilitates the return of the belt 6 by insuring a positive release of tension on the low tension end of the belt as the force upon the button 35 is decreased.

Under normal conditions of running, when the clutch is engaged, the belt 6 is free upon the drum, and due to the small amount of stiffness present in the belt and the coiling about the drum, the belt makes contact with the drum lightly at the high tension end, and springs entirely free of the drum for the remainder of the belt. The wear of the belt when not pulling the clutch pedal is thus reduced to a minimum. It has been found that with a cast iron drum having a finished surface, and belts of leather or asbestos fabric, a satisfactory speed for the drum 5 while the transmission gear shift lever is being shifted, is of the order of magnitude of fifteen revolutions per minute.

While I have shown and described an embodiment of my invention in the form in which I have applied and tested it in a particular automobile, manifestly modifications can be made in the specific embodiment of my invention and within the spirit of the appended claims.

What is claimed is:

1. In an automobile having an engine, a belt driven electric generator, a chassis, and an independent clutch operating pedal, the combination of apparatus for smoothly and indirectly operating the independent clutch operating pedal which consists of a worm wheel and drum, a frame, a removable cover, a variable width frictional belt, an adjustable support, a floor button, and a motion increasing linkage, said worm wheel being driven from the belt driven electric generator, and driving the drum at greatly reduced speed relative to the engine speed, said frictional belt having several convolutions around the drum and having the high tension end connected adjustably to the independent clutch operating pedal and the low tension end to a part of said motion increasing linkage, said linkage having its motion initiated at said floor button, transmitting an increased motion to the low tension end of the frictional belt, and being returned to its normal position by means of springs, the worm wheel and drum being contained within said frame, the drum being protected from extraneous lubricants by means of the removable cover, and undesirable deflection of the drum prevented by means of the adjustable support, said combination providing a readily mountable appliance having both high force amplification and reliable reverse slippage of the belt upon the drum, whereby the independent clutch operating pedal can be smoothly deflected and maintained in any intermediate position without binding, by a small foot-pressure applied to the floor button, without preventing alternate operation of the independent clutch operating pedal directly.

2. The combination of apparatus for smoothly and indirectly engaging and disengaging the clutch in an automobile having an independent clutch operating pedal, an engine, a chassis, and an electric generator driven from the engine and located forward of the independent clutch operating pedal, which consists of a worm wheel and drum, a tapering frictional belt, a frame, a removable cover, an adjustable support, a floor button, and a motion increasing linkage, said worm wheel being driven from the electric generator and located adjacent thereto, and driving the drum at greatly reduced rotational speed relative to the engine speed, said tapering frictional belt having several convolutions about the drum, and having the wide end adjustably connected to the independent clutch operating pedal and the narrow end connected to the large motion part of the said motion increasing linkage, the motion of which is initiated by the said floor button, the worm wheel and drum being contained within the frame, the drum being protected from extraneous lubricants by the removable cover, the adjustable support being mounted upon and between the engine base and chassis serving to prevent undesirable drum deflection and binding, said combination providing a complete readily mountable appliance having both high amplification and reliable reverse belt slippage upon the drum, whereby the independent clutch operating pedal is smoothly operable in any intermediate position from the floor button, and whereby the independent clutch operating pedal is selectively operable.

3. In an automobile having an engine, a chassis, an independent clutch operating pedal, and an electric generator driven from the engine and mounted forward of the independent clutch operating pedal, the readily mountable apparatus, which consists of a worm wheel and drum, a tapering width frictional belt, a frame, a removable cover, an adjustable support, a floor button, and a motion increasing linkage returned to normal position by means of springs, said worm wheel being driven from the electric generator and located adjacent thereto, and driving the drum at greatly reduced rotational speed relative to the engine speed, said tapering width frictional belt having several convolutions about the drum and having the wide end adjustably connected to the clutch operating pedal and the narrow end to the large motion part of the motion increasing linkage, the motion of which is initiated by said floor button, the worm wheel and drum being contained within the frame and rotating in a fixed direction independent of the forward or backward motion of the automobile, the drum being protected from extraneous lubricants by the removable cover, and the adjustable support being mounted upon and between the engine base and chassis serving to prevent undesirable drum deflection and binding, said readily mountable apparatus providing both high force amplification and smooth reverse belt slippage upon the drum, whereby the independent clutch operating pedal is smoothly operable in any intermediate position from the floor button, and whereby the independent clutch operating pedal is selectively operable.

4. An automobile clutch control system comprising a worm wheel and drum, a system of motion increasing and transmitting levers, an adjustable support, a tapering width flexible frictional belt, a floor button, and a clutch pedal attachment, said worm wheel being driven by the automobile engine, and rotating the drum in a fixed direction at greatly reduced speed relative to the engine speed, said worm wheel and drum being contained within a frame which is fastened at one end to the engine support, and at the other end adjustably supported upon the engine base and chassis by means of the adjustable support, the tapering width flexible frictional belt being adjustably connected at one end to the clutch pedal attachment and at the other end to the system of motion increasing and transmitting levers, the motion of which is initiated and controlled at said floor button which is located in a comfortable floor position for the operator, the said flexible frictional belt having one or more convolutions about the drum, the worm wheel and drum being covered by a removable case through which the flexible frictional belt passes, and the system of motion increasing and transmitting levers being held in their normal position by means of springs, whereby the application of a small force and motion to the floor button applies a larger force and motion to the clutch pedal sufficient to smoothly deflect and maintain the clutch pedal in any intermediate position, and whereby the clutch pedal and floor button are selectively operable for engaging or disengaging the clutch.

In witness whereof I have hereunto set my hand this 29th day of May, 1930.

EDWARD H. LANGE.